United States Patent
Schunck et al.

[11] Patent Number: 6,039,667
[45] Date of Patent: Mar. 21, 2000

[54] SUN GEAR LUBRICATION AND INSPECTION MECHANISM

[75] Inventors: Richard A. Schunck, New Berlin; Gordon L. Sokolowski, Waukesha, both of Wis.

[73] Assignee: The Falk Corporation, Milwaukee, Wis.

[21] Appl. No.: 09/159,454

[22] Filed: Sep. 24, 1998

[51] Int. Cl.[7] .................................................. F16H 57/04
[52] U.S. Cl. ........................ 475/159; 184/6.12; 184/11.4
[58] Field of Search ............................... 184/6.12, 13.1, 184/11.4; 475/159, 160

[56] References Cited

U.S. PATENT DOCUMENTS

| | | | |
|---|---|---|---|
| 1,399,443 | 12/1921 | Rennerfelt. | |
| 1,470,947 | 10/1923 | Tyler. | |
| 1,874,646 | 8/1932 | Skinner. | |
| 2,102,973 | 12/1937 | Porsche | 74/311 |
| 2,200,051 | 5/1940 | Badertscher | 184/11.4 |
| 2,795,155 | 6/1957 | Bade | 74/805 |
| 3,429,400 | 2/1969 | Engle et al. | 184/11 |
| 3,854,553 | 12/1974 | Miller | 184/6.12 |
| 4,157,668 | 6/1979 | Fukuma et al. | 475/159 |
| 4,957,187 | 9/1990 | Burgess | 184/6.12 |
| 5,472,383 | 12/1995 | McKibbin | 184/6.12 |
| 5,597,370 | 1/1997 | Nogle | 475/159 |

FOREIGN PATENT DOCUMENTS

| | | | |
|---|---|---|---|
| 470007045 | 2/1972 | Japan | 475/159 |
| 590106761 | 6/1984 | Japan | 475/159 |
| 404000053 | 1/1992 | Japan | 475/159 |

*Primary Examiner*—Tamara L. Graysay
*Assistant Examiner*—Chong H. Kim
*Attorney, Agent, or Firm*—James A. Wanner

[57] ABSTRACT

A lubrication mechanism for directing lubrication to the teeth of the sun gear of a planetary gear set without requiring separate pumping mechanisms wherein the rotating planet carrier has a deflector and generally radially extending passageways so as to collect lubricant within the casing and direct it through the passageways to the outwardly facing sun gear teeth. The passageways are also used for providing visual inspection of the sun gear teeth to determine the amount of wear of the sun gear teeth.

4 Claims, 4 Drawing Sheets

6,039,667

SUN GEAR LUBRICATION AND INSPECTION MECHANISM

FIELD OF THE INVENTION

The present invention is directed to planetary gear mechanisms and more particularly to a method and apparatus for lubricating the teeth of the sun gear during operation without requiring separate lube pump means and means for inspecting the teeth of the sun gear when the planetary gear set is stationary but without requiring disassembly of the planetary gear set.

The sun gear in a planetary gear set is centrally located and normally has the highest speed of rotation and furthermore has its teeth on the exterior periphery. Due to the location of the teeth and the high speed rotation of the sun gear, lubrication on the sun gear teeth is flung outward. This effect in combination with centrifugal viscous forces imposed on the lubricant by the carrier plates creates the potential for insufficient lubrication of the sun gear teeth which mesh with the planet gears. Furthermore, if the sun gear teeth are inadequately lubricated, excessive wear can occur on the sun gear teeth which necessitates the frequent inspection of the sun gear teeth. Because of the compact enclosed nature of a planetary gear set it is often difficult in inspect the sun gear teeth without at least partial disassembly of the planetary gear set.

BACKGROUND OF THE INVENTION

Planetary gear sets normally have a central sun gear having teeth on the periphery thereof, a plurality (normally three) of planet gears circumferentially spaced around the sun gear and mounted on a carrier, and an external ring gear. The input to the planetary gear mechanism can be to the sun gear, the ring gear, or the planet carrier, while the output is from either of the two aforesaid means which are not the input. The planetary gear set is normally mounted within a housing which also acts as a lubrication sump and it is thus partly or completely filled with lubrication. Upon rotation of the elements in a planetary gear set the lubrication is flung outwardly which tends to provide fairly active lubrication of the inner teeth of the ring gear but can provide less than adequate lubrication of the exterior teeth of the sun gear; first because the sun gear may not be immersed in oil and secondly because of the mesh expulsion and viscous centrifugal forces which cause the lubrication to be flung outwardly.

A logical means to provide lubrication to the sun gear teeth is by a separate pump mechanism which would spray oil or lubrication through spray nozzles aimed at the teeth of the sun gear. However, this requires a separate mechanism with the resulting complications. Such a separate pumping mechanism is taught in Tyler U.S. Pat. No. 1,470,947 but with the pump lubricant being fed to the planetary gear bearings. It is desirable to provide forced lubrication toward the sun gear teeth to overcome the centrifugal effect but without requiring such separate mechanism.

The friction gearing mechanism of Rennerfelt U.S. Pat. No. 1,399,443 uses scoop mechanisms on what would be equivalent to a planetary gear carrier to direct housing sump fluid to the bearings of rollers 10 mounted on the carrier. However, it does not direct lubricating fluid to the pinion 18 and probably prefer not to do so because of the friction gearing, rather than teeth gearing, design taught.

Bade U.S. Pat. No. 2,795,155 teaches oil scoops carried on the periphery of the rotating ring gear with the oil directed to the speed reducer gearing and particular bearings therefor.

However, none of the prior art mentioned above specifically shows utilizing scoop or deflector mechanisms carried by a rotating part of the planetary gear set which are used to deflect oil through radially extending openings in the carrier into close proximity with the sun gear teeth, that is the part of the planetary gearing which has great need for lubrication.

Planetary gear sets are furthermore subject to wearing with the highest gear teeth wearing being on the sun gear. While it is possible to remove the sun gear for inspection of its teeth, this is complicated by the fact that the sun gear is located in the center of the mechanism and requires substantial disassembly of the planetary gear mechanism to reach the sun gear for inspection of its teeth. Furthermore, the sun gear shaft (and carrier shaft) are often connected to other equipment such as the prime mover and output of a system, or the planetaries are arranged in multiple stages, which further complicates disassembly.

SUMMARY OF THE INVENTION

It is one object of the present invention to provide a lubrication system for the teeth of the sun gear without the need of an external pumping mechanism. In furtherance of such object, the rotating planetary carrier of the planetary gear set has deflectors mounted thereon which are aligned with inwardly extending passageways through the carrier, such passageways having inner ends in close proximity to the teeth of the sun gear so that rotation of the carrier permits deflection of lubrication in the casing through the radially extending passageways resulting with oil in contact with the sun gear teeth.

It is a further object of the invention that the planetary carrier of a planetary gear set has generally radially extended passageways with the inner end of the passageways in close proximity to sun gear teeth, the passageways permitting the insertion of an inspection tool from the outside of the carrier into close proximity of the sun gear teeth so that inspection of the sun gear can be made without major disassembly of the planetary gear set.

DETAILED DESCRIPTION OF THE PREFERRED EMBODIMENT

Figure 1:
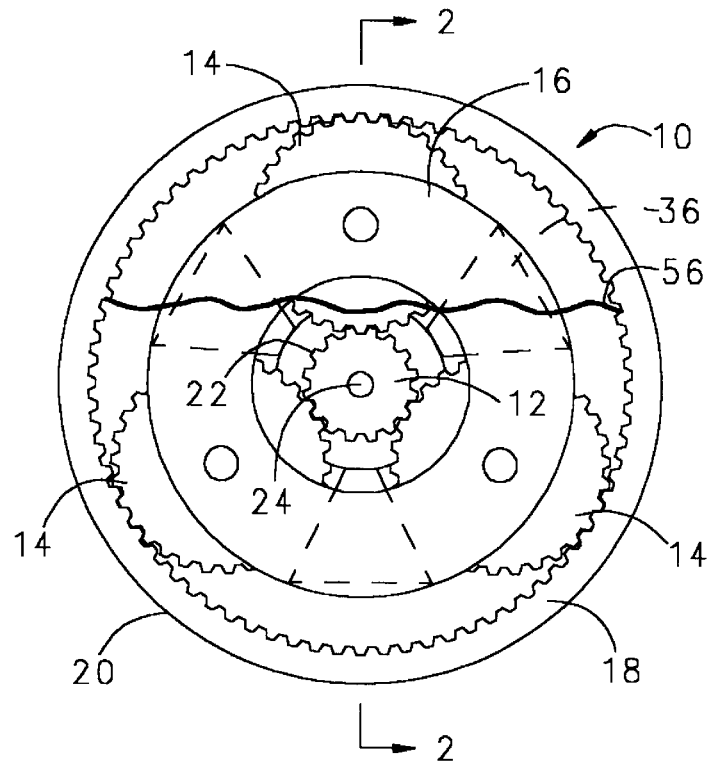
FIG. 1 is a side view, partly in section, showing the prior art planetary gear set which forms an environment of the present invention.
Figure 2:
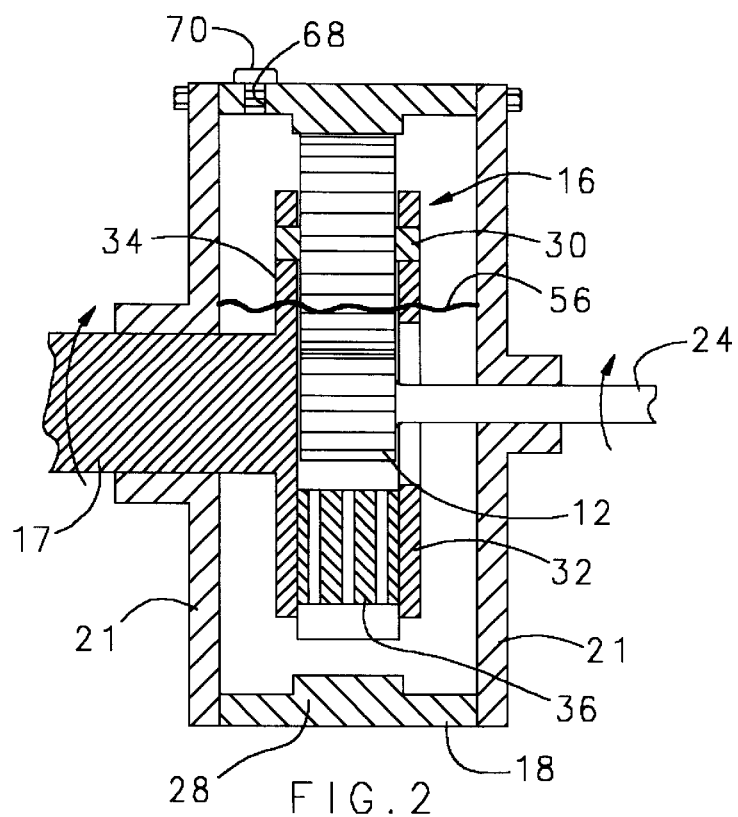
FIG. 2 is a sectional view taken along lines 2—2 of FIG. 1 of the prior art planetary gear set which forms the environment of the present invention.
Figure 3:
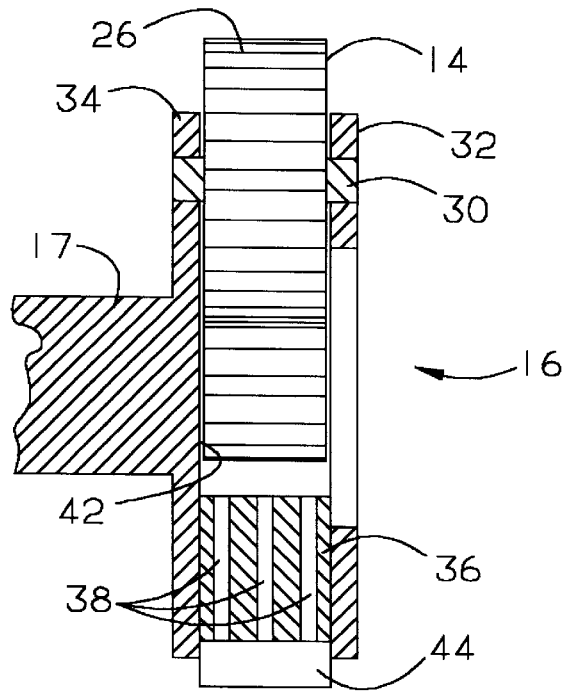
FIG. 3 is a sectional view of the planet gear carrier of the present invention showing one planet gear and the diametrically opposed planet carrier spacer.

The planetary gear set lubrication system of the present invention is applied to the environment of a planetary gear set 10 shown in FIGS. 1 and 2 consisting of a sun gear 12, three equally circumferentially spaced planet gears 14 mounted on a carrier 16, and a ring gear 18 all located within a housing 20. In the particular example taught, the housing 20 is actually formed by the ring gear 18 and a pair of end housings 21. As is normal practice, sun gear 12 has peripheral exterior teeth 22 on the periphery thereof and sun gear is mounted for rotation at about its axis or sun gear shaft 24 supported by the housing 20. Periphery located relative to the sun gear are the three planet gears 14 each having exterior teeth 26 on the periphery thereof. The planet gear teeth 26 mesh with both the exterior teeth 22 of the sun gear 12 and the interior teeth 28 of the ring gear 18. Each of the three planet gears 14 are mounted by shafts 30 carried by end plates 32 and 34 of the planet carrier 16 which in turn is supported in end housing 21 by the carrier shaft 17 formed with end plate 34. Spaced diametrically across from each planet gear 14 is a planet gear carrier spacer 36; that is, each spacer 36 is diametrically on the other side of the sun gear 12 with respect to its own planet gear 14 and thus located in between the other two planet gears 14. In the particular exemplary planetary gear set shown, the input is sun gear shaft 24 and the output is carrier shaft 17. The embodiment so far described is a relatively conventional planetary gear set.

Figure 5A:
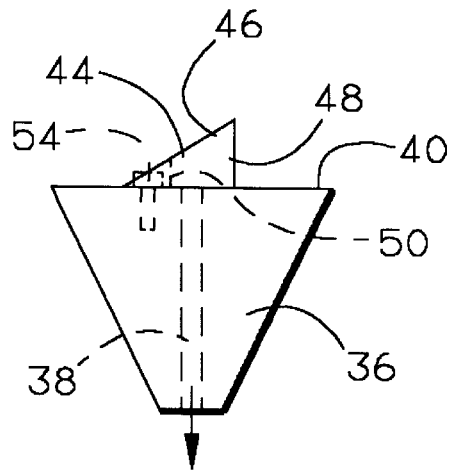
FIG. 5A is a side view of the carrier cross support with oil deflector of the present invention.
Figure 5B:
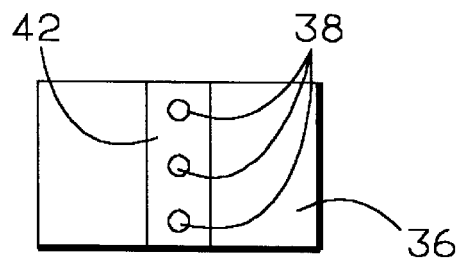
FIG. 5B is a plan view of the inner surface of the carrier cross support of FIG. 5A.

In order to increase lubrication to the sun gear teeth 22, each of the three spacers 36 are provided with generally radially extending passageways 38 connecting the outer surface 40 of the spacer with the inner surface 42 of the spacer. For manufacturing convenience, the passageways 38 are drilled radially through the spacers 36. Furthermore, there are three axially spaced passageways 38 in each of the spacers 36 so that the inner ends of the passageways 38, located at the spacer inner surface 42, are axially spaced across the inner surface 42 of the spacer as best seen in FIG. 5B. Because in the preferred embodiment there are three axially spaced passageways 38, they are axially spaced across the face of the sun gear 12.

Figure 4:
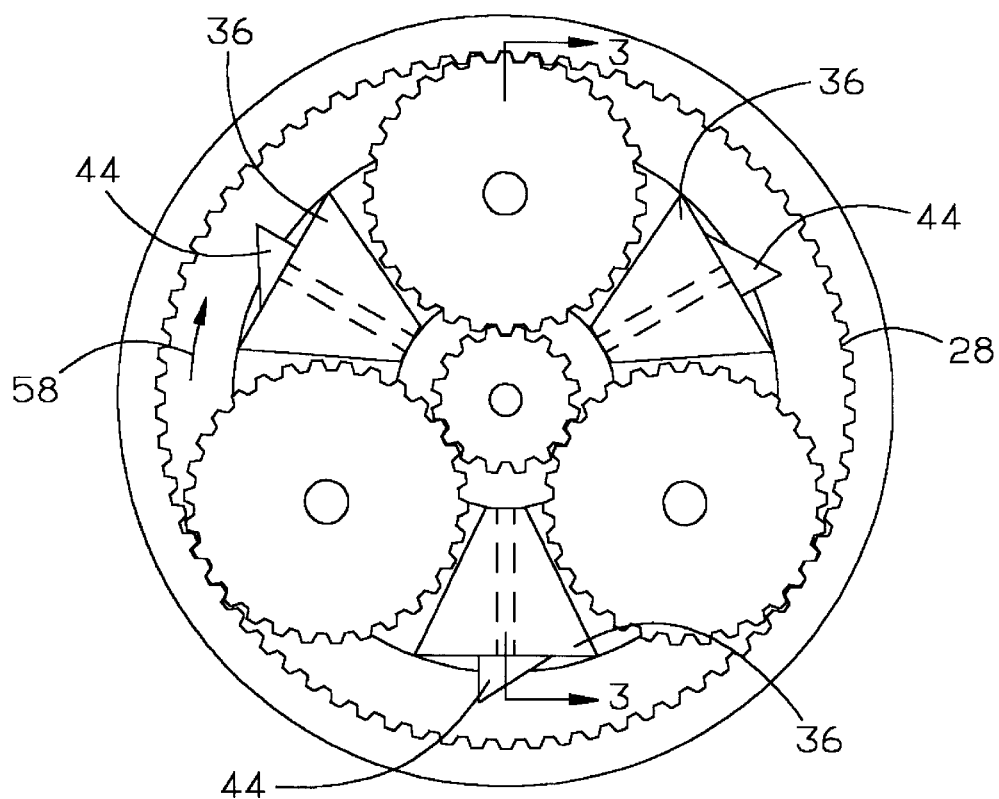
FIG. 4 is a sectional side view of the planetary gear set with one end plate of the planetary carrier removed showing the location of the passageways and deflector of the present invention.

Located in the outer surface of the spacer 40 of each carrier spacer 36 is an oil deflector 44. The oil deflector 44 has an angled surface 46 spaced radially outwardly from the outer end of the three oil passageways 38. The oil deflector also has an open side 48 and a back wall 50. Behind the back wall 50, the deflector 44 is also provided with three openings 52 permitting screws 54 to attach the deflector 44 to the spacer 36 as shown in FIG. 4A.

When the planetary gear set is in static condition, i.e. non-moving, the oil or lubricant has a certain static fluid level represented by line 56 within the housing 20. In a horizontal axis orientation of gear set 10, the fluid level 56 may be as low as the axis of sun gear shaft 24. In a vertical axis orientation, the housing 20 may be completely filled with oil. Upon rotation of the planetary gear set, the oil gets dispersed around the housing primarily periphery out toward the ring gear 18. With the carrier 16 moving in the clockwise direction as shown at 58 the angled surfaces 46 of the deflectors 44 scope in the oil from the casing forcing the oil down the passageways 38 and into contact with the external teeth 22 of the sun gear 12. This causes lubrication of the sun gear teeth 22 and since there are three axial spaced openings 38 in each spacer, this lubrication pattern is across the entire axial width of the sun gear teeth 22, the area of the planetary gear set most in need of supplemental lubrication.

Industrial planetary gear drives are generally used in critical applications where preventative maintenance procedures call for visual inspection of the internal components, more specifically, the condition of the gear teeth. Due to the general design of a planetary gear set and its compactness (and due to the connection to prime movers, outputs or multi-staging), conventional large inspection openings are not practical for inspection of certain portions of the planetary, and more specifically the sun gear teeth. Fiber optic technology have lead to the use of optic probes to help in the inspection of the gearing.

Figure 5C:
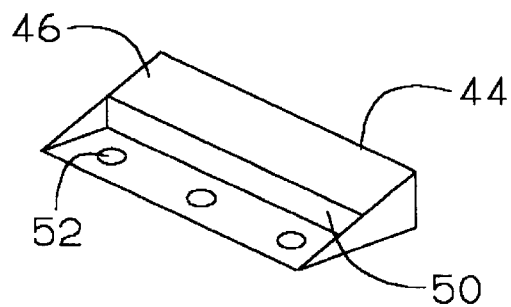
FIG. 5C is a isometric view of the oil deflector show in FIG. 5A.
Figure 6:
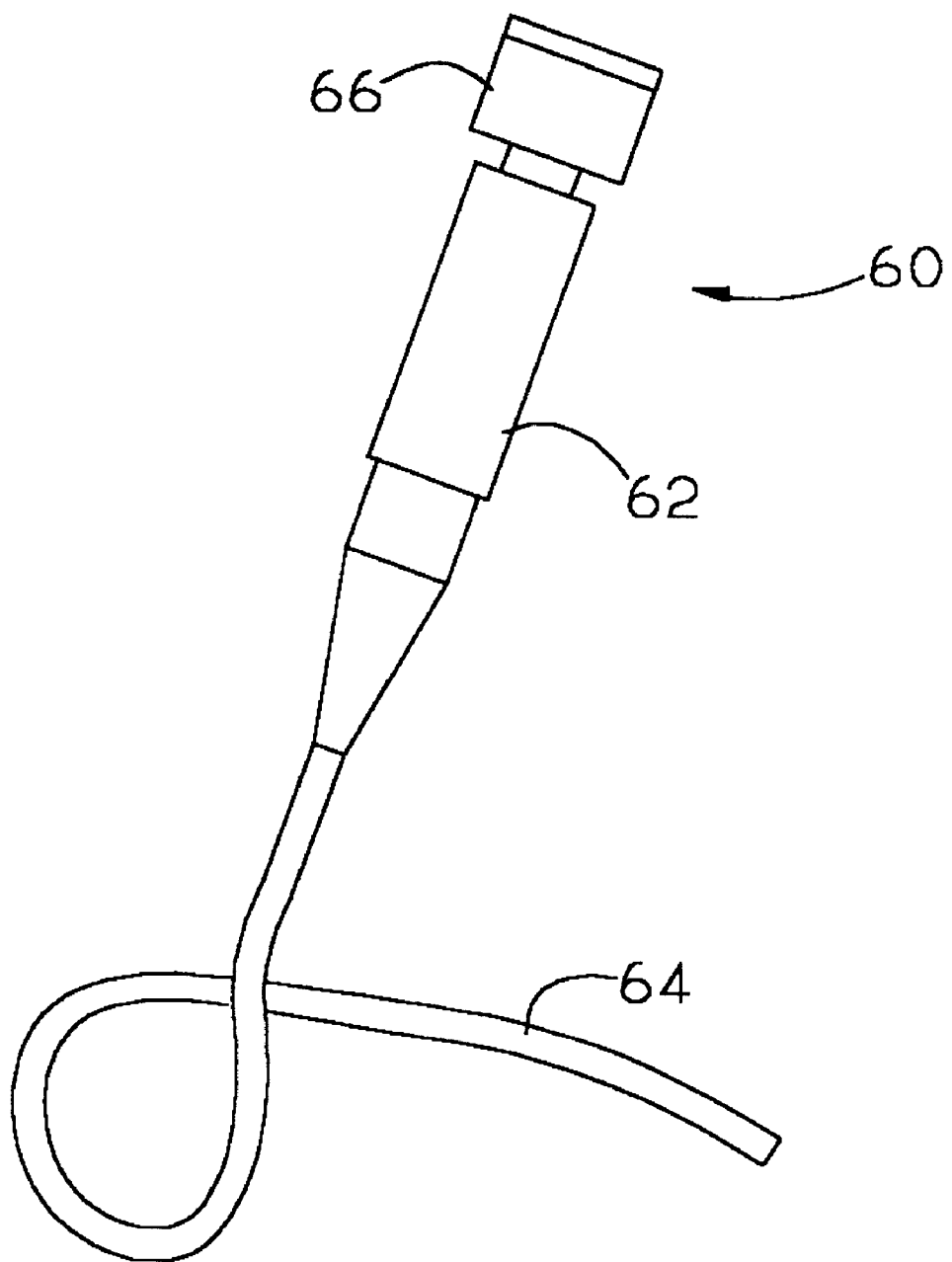
FIG. 6 is a pictorial view of an inspection instrument with a fiber optic tube which may be used in carrying forth one of the functions of the present invention.

With the present invention, the three radially extended passageways 38 through the spacer 36 permits readily access via fiber optic probes to the space between the inner surface 42 of the spacer and the sun gear teeth 22. The inspection instrument 60 shown in FIG. 5 has an instrument body 62, a fiber optic probe 64 and a viewing means 66. The probe 64 both conveys light to illuminate the target area as well as conveys the image from the target area to the viewing device 66. The probe 64 can be inserted through the access hole 68 normally covered by pipe plug 70 (both shown in FIG. 2 for convenience). The probe 64 then passes down each of the generally radially extending passageways 38 to get into the tight confines in space between the inner surface 42 of each spacer and the sun gear teeth 22. Because there are three axially spaced passageways in each spacer 36, the probe 64 can actually inspect the entire face width of the sun gear teeth 22 when the planetary gear set is stationary and the lubricant has been removed from the housing 20. While generally it is relatively easy to use the fiber optic inspection instrument 60 to inspect the ring gear teeth 28 and the planetary gear teeth 26 (especially when the latter positioned radially outwardly from the outer surface of the end plates 32 and 34), it is much more difficult to get to the inner area of planetary where the sun gear teeth 22 are located. However, the sun gear 12 sees the most loading cycles in the planetary use and thus it is most critical that the sun gear teeth 22 that are inspected. It is for such reason that the generally radially extending passageways 38 provide access to this critical inspection area.

The foregoing detailed description is provided in sufficient detail to enable one ordinary skilled in the art to make and use the sun gear lubrication inspection system. The foregoing detailed description is primarily illustrative of several physical embodiments, in other physical variations not fully described in the specification or encompass within the purview of the claims. According to the narrow description of the elements should be used for general guidance rather than to unduly restrict the broad description of the elements in the following claims.

We claim:

1. A planetary sun gear lubricant system for planetary gear set comprising a sun gear having peripheral teeth, plural planet gears supported by a carrier, and a ring gear all located in a housing which acts as a sump for a lubricant, said carrier being mounted for rotation in said housing and having circumferentially spaced apart axially extending spacer members having inner and outer surfaces, the improvement comprising:

at least one of said spacer members having a passageway extending from the outer surface of said spacer to the inner surface of said spacer, the inner end of said passageway being directed toward the teeth of said sun gear, said one of said spacer members on the outer periphery thereof having a deflector mounted thereon adjacent to the outer end of said passageway, said deflector being angled to the direction of rotation of said carrier, said deflector being in fluid communication with said passageway whereby rotary movement of the carrier supported deflector through the lubricant within the housing causing inward deflection of the lubricant through the passageway to the teeth of said sun gear.

2. The planetary gear set lubrication system of claim 1 wherein said passageway includes plural axially spaced radial extending passageways.

3. The planetary gear set lubrication system of claim 1 wherein each of said spacers has a passageway extending from the outer surface of said spacer to the inner surface of said spacer said passageway with a deflector mounted on the outer surface of said spacer and adjacent to the outer end of said passageway.

4. A planetary sun gear inspection assisting device system for a planetary gear set comprising a sun gear having a peripheral teeth, plural planet gears supported by a carrier, and a ring gear, said carrier being mounted for rotation and having circumferentially spaced apart axially extending spacer members having inner and outer surfaces, the improvement comprising:

at least one of said spacer members having a passageway for receiving an optical probe used for inspecting the teeth of the sun gear extending from the outer surface of said spacer to the inner surface of said spacer, the end of said passageway being at the inner surface of the spacer being in close proximity to said teeth of said sun gear.

* * * * *